United States Patent [19]

Tremblay

[11] 3,722,128
[45] Mar. 27, 1973

[54] SNAG SHIELD AND SCENT CARRIER FOR LURE HOOKS

[76] Inventor: Denis Tremblay, 526 Yale Avenue, E., Winnipeg, Manitoba, Canada

[22] Filed: Feb. 3, 1971

[21] Appl. No.: 112,309

[52] U.S. Cl. ............... 43/42.1, 43/42.06, 43/42.4, 43/43.2, 43/57.5
[51] Int. Cl. .............................................. A01k 83/00
[58] Field of Search........ 43/42.28, 42.4, 42.24, 42.1, 43/42.06, 43.2, 57.5

[56] References Cited

UNITED STATES PATENTS

| | | |
|---|---|---|
| 2,191,244 | 2/1940 | Wise................................43/42.1 |
| 3,363,357 | 1/1968 | Sokol.............................43/57.5 R X |
| 2,332,400 | 10/1943 | Richardson .........................43/42.1 |
| 2,590,461 | 3/1952 | Rasch..................................43/42.1 |

Primary Examiner—Robert W. Michell
Assistant Examiner—George M. Yahwak
Attorney—Kent & Ade

[57] ABSTRACT

A flexible porous shield is engaged over the shank of a fish hook and shields the barbs from snags yet does not interfere with the barb engagement when struck. The porous material may also be used as a scent carrier.

1 Claim, 6 Drawing Figures

PATENTED MAR 27 1973                    3,722,128

INVENTOR
DENIS TREMBLAY
BY
*Caro s Ade*

SNAG SHIELD AND SCENT CARRIER FOR LURE HOOKS

This invention relates to new and useful improvements in devices which may be attached to the hooks of lures to prevent snagging and tangling and also to act as a scent carrier if desired.

It is well known that artificial lures, often containing a plurality of treble hooks, easily become tangled with one another in a tackle box and furthermore are easily snagged when trolling or retrieving from casting.

Furthermore, these hooks are extremely sharp and are easily engaged with clothing or even the flesh of the user or onlookers.

Attempts have been made to protect such hooks but most of these protectors have to be removed when the lure is being used and it is at this time that the most danger occurs.

The present device is designed to be readily placed upon the hooks and remain there both during storage and use inasmuch as it is formed from a resilient plastic or natural rubber foam so that the fish can be engaged by the hook as soon as the fish strikes same.

Another advantage of the invention is that it can carry smear paste type or liquid scents used to attract fish in certain locations and types of fishing.

The foam material used also allows it to retain its shape even when wet without allowing the hook barbs to become exposed thus giving snag protection during trolling or cast retrieving.

Another object of the invention is to provide a device of the character herewithin described which is extremely simple in construction, economical in manufacture, and otherwise well suited to the purpose for which it is designed.

With the considerations and inventive objects herein set forth in view, and such other or further purposes, advantages or novel features as may become apparent from consideration of this disclosure and specification, the present invention consists of the inventive concept which is comprised, embodied, embraced, or included in the method, process, construction, composition, arrangement or combination of parts, or new use of any of the foregoing, herein exemplified in one or more specific embodiments of such concept, reference being had to the accompanying Figures in which.

In the drawings like characters of reference indicate corresponding parts in the different figures.

Figure 1:
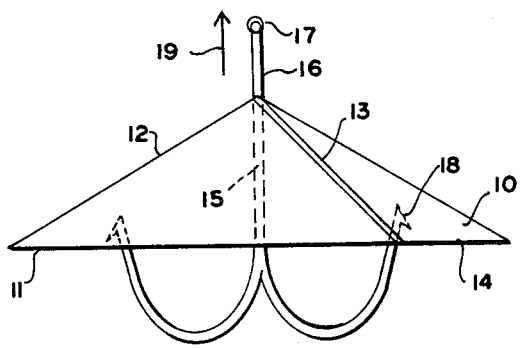
FIG. 1 is a side elevation of one embodiment of the device showing a hook engaged therein.
Figure 2:
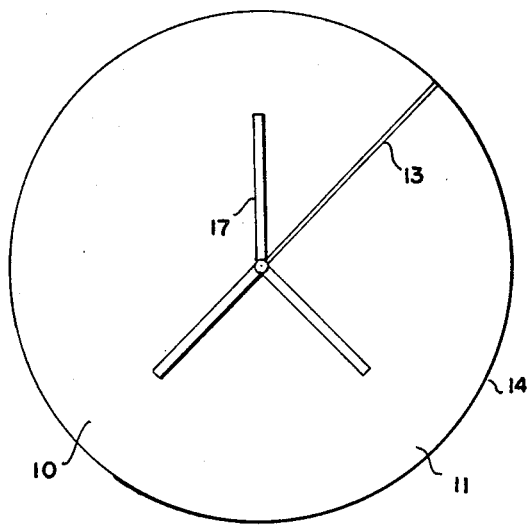
FIG. 2 is an underside view of FIG. 1.

Proceeding therefore to describe the invention in detail, the preferred embodiment is shown in FIGS. 1 and 2.

It consists of a cone shaped piece of resilient foam plastic 10 having a base 11 and sloping sides 12.

A slit or cut 13 extends from the perimeter 14 of the base to the central vertical axis indicated by reference character 15 and the resiliency of the material enables the device to be engaged around the shank 16 of a treble hook element 17 and be retained thereby with the shank lying coincident with the vertical axis 15.

The hook barbs 18 are then engaged within the base 11 of the foam as shown in FIG. 1 and the foam is retained in position at all times. Inasmuch as such hooks are normally trolled or retrieved in the direction of arrow 19, the cone shaping of the foam plastic gives a streamlined effect and prevents too great a turbulence from being created.

When a fish strikes, the foam plastic being relatively soft is easily pierced by the hook barbs which then engage the mouth of the fish in the usual way.

Figure 3:
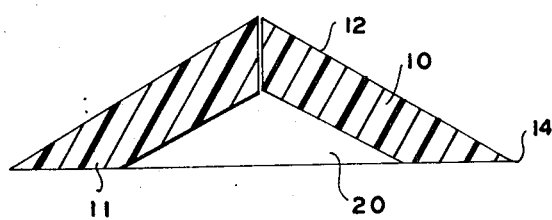
FIG. 3 is a sectional view showing an alternative embodiment.

FIG. 3 shows an alternative embodiment in which a cone shaped recess 20 is formed concentrically within the base. This permits the retention of paste type scent material.

Figure 4:
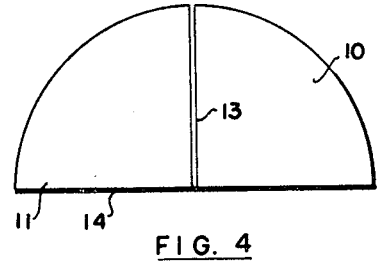
FIG. 4 is a side elevation showing an alternative embodiment.

FIG. 4 shows a similar construction except that the shape is hemispherical, the slit 13 being similar to that herein before described.

Figure 5:
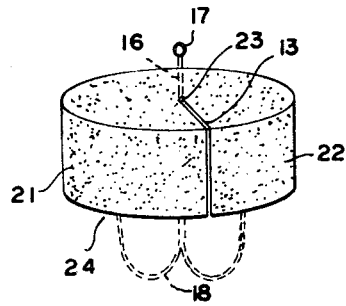
FIG. 5 is an isometric view showing a still further embodiment.

FIG. 5 is a cylinder of plastic foam 21 also having the slit 13 extending from the wall 22 to the vertical axis 23. Once again the hook shank 16 may be engaged through the slit and lie coincident with the vertical axis 23 with the hook barbs engaging the undersurface 24 as clearly shown.

Figure 6:
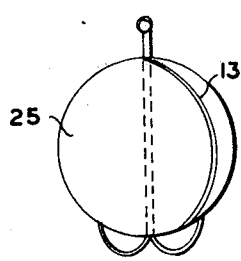
FIG. 6 is a side elevation showing a further embodiment.

FIG. 6 shows a sphere of plastic foam 25 having a slit 13 extending from the outer surface to the vertical axis. When this is engaged around the shank not only are the barbs protected but also the shank for the majority of it's length.

All of the embodiments described may be cut, carved or moulded from flexible plastic foam or equivalent natural rubber foam.

As an alternative to the slit 13, the various embodiments particularly those shown in FIGS. 4, 5 and 6, may be moulded directly onto the hook with the barbs permanently embedded therein.

All of the embodiments shown may, of course, be saturated with liquid fish scents or may be smeared with paste type as desired.

Various modifications can be made within the scope of the inventive concept which is herein disclosed and/or claimed. Accordingly, it is intended that what is set forth should be regarded as illustrative of such concept and not for the purpose of limiting protection to any particular embodiment thereof, and that only such limitations should be placed upon the scope of protection to which the inventor hereof is entitled as justice dictates.

What I claim as my invention is:

1. In a fishing device, the combination of a fish hook including a shank provided with a set of upturned hook members terminating in sharp barbs at their upper ends, and a hook shield comprising a conical body of resilient foam plastic material, said body having a flat base and being provided with an axial bore and with a radial slit extending through the body from said bore to the periphery of said base, the shank of said hook being disposed in said bore upon being inserted thereinto laterally through said slit, the radius of said base being substantially greater than the distance of said barbs from said shank and said barbs being embedded in the base portion of said body at points spaced radially inwardly from the periphery of said base, said body and said hook being usable as a unit during fishing and the material of the body being sufficiently resilient as to be compressed by a biting fish to facilitate engagement of said barbs with the mouth of the fish.

* * * * *